(12) United States Patent
Fontana et al.

(10) Patent No.: US 8,804,949 B2
(45) Date of Patent: Aug. 12, 2014

(54) METHOD FOR PROTECTING IC CARDS AGAINST POWER ANALYSIS ATTACKS

(75) Inventors: Giovanni Fontana, Naples (IT); Saverio Donatiello, Mercogliano (IT); Giovanni Di Sirio, Salerno (IT)

(73) Assignee: STMicroelectronics International N.V., Geneva (CH)

( * ) Notice: Subject to any disclaimer, the term of this patent is extended or adjusted under 35 U.S.C. 154(b) by 1255 days.

(21) Appl. No.: 11/770,997

(22) Filed: Jun. 29, 2007

(65) Prior Publication Data

US 2008/0019507 A1    Jan. 24, 2008

(30) Foreign Application Priority Data

Jun. 29, 2006   (EP) ..................................... 06013441

(51) Int. Cl.
    *H04K 3/00*         (2006.01)

(52) U.S. Cl.
    USPC ............................................................ 380/1

(58) Field of Classification Search
    USPC ................ 380/28, 300, 340, 1; 713/189–194; 726/22
    See application file for complete search history.

(56) References Cited

U.S. PATENT DOCUMENTS

| | | | |
|---|---|---|---|
| 6,419,159 B1 * | 7/2002 | Odinak | 235/492 |
| 7,941,666 B2 * | 5/2011 | Kocher | 713/172 |
| 2001/0023484 A1 * | 9/2001 | Ichimura | 713/193 |
| 2003/0093684 A1 * | 5/2003 | Kaiserswerth et al. | 713/193 |
| 2004/0025032 A1 * | 2/2004 | Chow et al. | 713/189 |
| 2004/0030905 A1 * | 2/2004 | Chow et al. | 713/189 |

FOREIGN PATENT DOCUMENTS

| | | | | |
|---|---|---|---|---|
| DE | 19936939 | | 9/1998 | ............. G06F 12/14 |
| FR | 2785477 | | 10/1998 | ............. H04L 9/06 |
| GB | 2345229 | | 6/2000 | ............. H04L 9/06 |
| WO | WO 99/63696 | * | 6/1999 | ............. H04K 1/00 |

* cited by examiner

*Primary Examiner* — Beemnet Dada
(74) *Attorney, Agent, or Firm* — Allen, Dyer, Doppelt, Milbrath & Gilchrist, P.A.

(57) ABSTRACT

A method for protecting data against power analysis attacks includes at least a first phase of executing a cryptographic operation for ciphering data in corresponding enciphered data through a secret key. The method includes at least a second phase of executing an additional cryptographic operation for ciphering additional data in corresponding enciphered additional data. An execution of the first and second phases is undistinguishable by the data power analysis attacks. Secret parameters are randomly generated and processed by the at least one second phase. The secret parameters include an additional secret key ERK for ciphering the additional data in the corresponding enciphered additional data.

26 Claims, 2 Drawing Sheets

METHOD FOR PROTECTING IC CARDS AGAINST POWER ANALYSIS ATTACKS

FIELD OF THE INVENTION

The present invention relates to integrated circuit (IC) cards. More particularly, the present invention relates to protecting IC cards against power analysis attacks.

BACKGROUND OF THE INVENTION

Cryptographic algorithms like DES, triple DES, AES, SHA, and RSA are used to cipher data to render it secure against possible attacks. For example, cryptographic algorithms are implemented in an IC card to cipher data stored in a memory unit of the IC card.

More particularly, the cryptographic algorithm is a mathematical transformation applying a secret key to one or more data inputs to obtain one or more corresponding data outputs. Without the knowledge of such a secret key, the data output cannot be used to retrieve the data inputs.

More particularly, a cryptographic algorithm generally comprises a plurality of operations at least one of which, hereinafter also indicated as cryptographic operation, involves a secret key. The cryptographic algorithm and all the cryptographic operations are implemented in software or hardware intended to be run on a processor of the IC card.

Generally, an attack is intended to discover the secret key stored in the IC card, and consequently, to discover sensitive data stored therein. The attack generally implements an analysis of the processor during its execution for discovering implementation-specific characteristics of the cryptographic algorithm.

For example, power consumption of the processor may be associated to an execution of cryptographic operations included in the cryptographic algorithm. A cryptographic operation may be easily detectable because it generally involves intensive computational operations corresponding to high power consumption for the processor.

More particularly, the analysis of the power consumption in an IC card may provide information about the cryptographic operations, the processor clock pulses or information about the terminal that the IC card is connected since the IC card power is provided by the terminal itself.

More particularly, Differential Power Analysis (DPA) may be based on a large number of subsequent executions of the same cryptographic algorithm intended to analyze the processor power consumptions, and to make a potential association between such consumption and the secret key used by the cryptographic algorithm. For example, two similar power consumptions detected in two different executions of the same cryptographic algorithm may be related to the execution of the same or similar cryptographic operations, probably involving the same secret key.

Also, Simple Power Analysis (SPA) based on simpler attacks that do not require statistical analysis may be used to detect secret keys. Both Simple Power Analysis (SPA) and Differential Power Analysis (DPA) are applied without knowing the design of the IC card object of analysis. They are non-invasive and easily automated.

With reference to FIG. 1, a cryptographic algorithm for protecting data against possible attacks is schematically shown in a block diagram, globally indicated with numeral reference 10. More particularly, the cryptographic algorithm may comprise a sequence of cryptographic operations OP intended to cipher one or more plain texts M1, ..., MN in corresponding enciphered texts C1, ..., CN. As schematically shown, the sequence of cryptographic operations OP ciphers the plain texts M1, ..., MN through a secret key ESK.

At the present, hardware and software countermeasures are known to reduce the leakage of information during possible attacks. For example, such countermeasures add noise to the power consumption measurements associated to the execution of cryptographic operations OP involved in the use of the secret key ESK.

For instance, a randomizing delay may be inserted when a cryptographic operation OP is performed in order to de-correlate subsequent executions of the cryptographic algorithm. The execution time of such an algorithm and the execution time of the corresponding cryptographic operations may be non-predictable. In this way subsequent executions of the same cryptographic algorithm requires different computational time.

These countermeasures render a signal amplitude measurement associated to the power consumption of the cryptographic operations OP useless to derive information about the secret key ESK involved in the cryptographic algorithm. These countermeasures do not completely mislead an attack based on power consumption from the detectability of the cryptographic algorithm. This is because the execution time of such a cryptographic algorithm is abnormal during subsequent executions due to the introduction of the randomizing delay.

For example, if the power consumption between two subsequent executions of the same cryptographic operation is different, an attack may detect an abnormal behavior of such executions and associate the abnormal behavior to a potential use of a secret key. In this way, the attack concentrates the analysis near the abnormal executions to recover the secret key ESK of the cryptographic algorithm and the sensible data.

SUMMARY OF THE INVENTION

In view of the foregoing background, an object is to prevent power analysis attacks on IC cards by not only dissociating power consumption by cryptographic operations involved in a cryptographic algorithm, but also to mislead such an attack through introduction of additional cryptographic operations intended to be analyzed for sidetracking the attacker.

This and other objects, advantages and features are provided by introducing a random number of additional cryptographic operations involving secret random parameters.

More particularly, a method for protecting data comprises a first phase for executing at least a cryptographic operation for ciphering data in corresponding enciphered data, and at least a second phase for executing an additional cryptographic operation for ciphering additional data in corresponding enciphered additional data. Execution of the first phase and the second phase may be undistinguishable by the power analysis attacks.

The above method may be used for protecting IC cards against power analysis attacks as previously indicated. More particularly, the at least one first phase of executing a cryptographic operation ciphers the data in the corresponding enciphered data through a secret key. The method may further comprise at least a second phase of executing an additional cryptographic operation (AOP) for ciphering additional data in corresponding enciphered additional data through an additional secret key (ERK). The additional data and the additional secret key (ERK) may be randomly generated so that an execution of the first and second phases is undistinguishable by said power analysis attacks.

BRIEF DESCRIPTION OF THE DRAWINGS

Further characteristics and advantages of the method according to the present invention will be apparent from the following description of an embodiment thereof, made with reference to the annexed drawings, given for illustrative and non-limiting purposes.

DETAILED DESCRIPTION OF THE PREFERRED EMBODIMENTS

Figure 1:
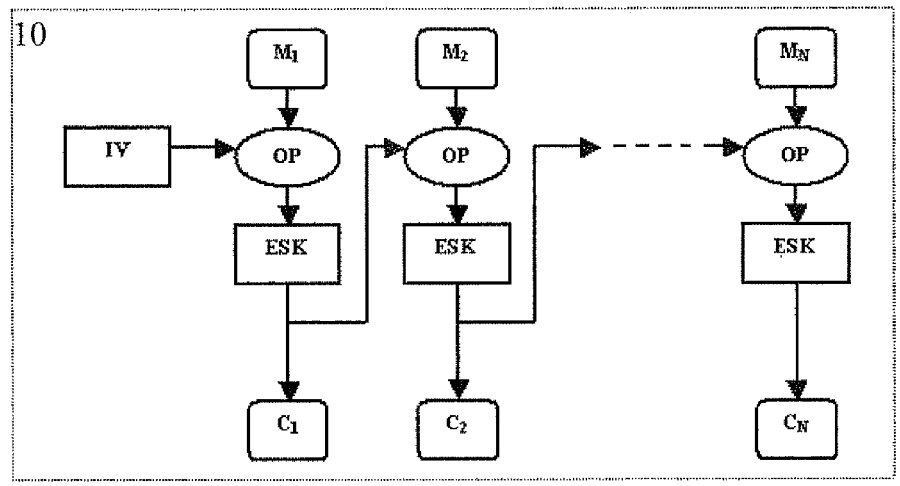
FIG. 1 schematically shows in a block diagram a method for protecting data comprising a sequence of operations intended to cipher plain texts in corresponding enciphered texts according to the prior art.
Figure 2:
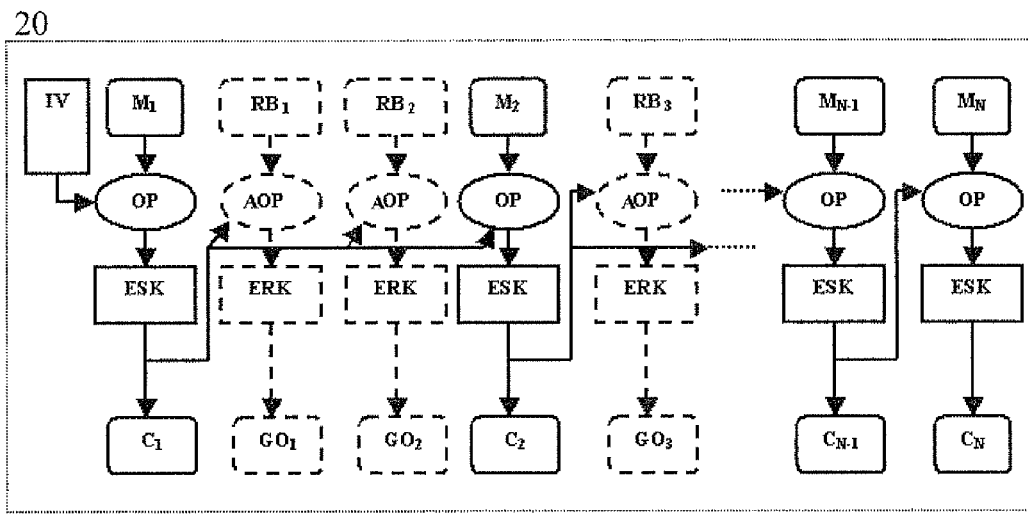
FIG. 2 schematically shows in a block diagram a method for protecting data comprising a sequence of operations intended to cipher plain texts in corresponding enciphered texts according to the present invention.

With reference to FIG. 2, a method for protecting data against power analysis attacks is schematically shown in a block diagram, globally indicated with numeral reference 20. More particularly, the method comprises a sequence of cryptographic operations OP intended to cipher one or more plain texts M1, ..., MN in corresponding enciphered texts C1, ..., CN. As schematically shown, the sequence of cryptographic operations OP cipher the plain texts M1, ..., MN through a secret key ESK.

The plain texts M1, MN are stored in a memory unit of an IC card with at least a secret key ESK for their encryption, for example. The secret key ESK is unknown externally from the IC card, and is an object of external attacks. In fact, the plain texts M1, ..., MN enciphered in enciphered texts C1, ..., CN may be retrieved through the secret key ESK.

The cryptographic operations OP intended to cipher one or more plain texts M1, ..., MN in corresponding enciphered texts C1, ..., CN are interleaved by additional cryptographic operations AOP. More particularly, such additional cryptographic operations AOP comprise a plurality of secret parameters, random generated, such as one or more random plain texts RB, for example.

One or more elaborations of the random plain texts RB is inserted in the cryptographic algorithm, for example between one or more cryptographic operations intended to encipher one or more of the plain texts M1, ..., MN.

The plurality of secret parameters also comprises random secret keys ERK, randomly generated and used to encipher the one or more plain texts RB. More particularly, a cryptographic operation OP intended to encipher a plain text M1, ..., MN with the secret key ESK is interleaved by an additional cryptographic operation AOP intended to encipher a random plain text RB with a random secret key ERK.

The additional cryptographic operation AOP on the random plain text RB has the same behavior of cryptographic operation OP on a plain text M, for example requiring a similar time of execution. The additional cryptographic operation AOP generates a garbage output that is not considered by the cryptographic algorithm for the effective ciphering of data.

In such a way, an attack is involved in an additional series of analysis intended to examine the power consumption of the additional cryptographic operations AOP. The medium time of succeeding in finding a secret key ESK is arbitrarily increased. In fact, the attack analyzes not only the cryptographic operations using the secret key ESK but also the cryptographic operations based on the random secret key ERK. More particularly, the random plain texts RB may be inserted in a scattered way in the original plain text M.

Again with reference to FIG. 2, two subsequent additional cryptographic operations AOP are inserted between two cryptographic operations. These are intended to cipher the plain texts M1 and M2 through the secret key ESK. The plain texts M1 and M2 are ciphered in corresponding enciphered text C1 and C2 while a couple of random plain texts RB1 and RB2 are enciphered in corresponding garbage outputs GO through the additional cryptographic operations AOP.

The first additional cryptographic operation AOP encrypts the plain text RB1, randomly generated, through a secret key ERK that is also randomly generated. The corresponding output is marked as garbage output GO since it does not correspond to the plain text M1, MN to cipher.

The second additional cryptographic operation AOP encrypts the plain text RB2, randomly generated, through the secret key ERK. Also in this case, the corresponding output is marked as garbage output GO since it does not correspond to the plain text M1, MN and to a valid cryptographic operation.

All the cryptographic operations executed on these randomly generated plain texts RB do not influence the final output of the cryptographic algorithm. More particularly, the outputs of these additional cryptographic operations AOP are stored in one or more garbage-areas, for example in a portion of the memory unit of the IC card. These outputs are not considered in the successive additional cryptographic operations AOP.

Advantageously, the number and the disposition of additional cryptographic operations AOP between cryptographic operations may not be pre-determined but randomly managed. For example, depending on the use-requirements, a specific maximum number of additional cryptographic operations AOP is associated to the cryptographic algorithm.

Figure 3:
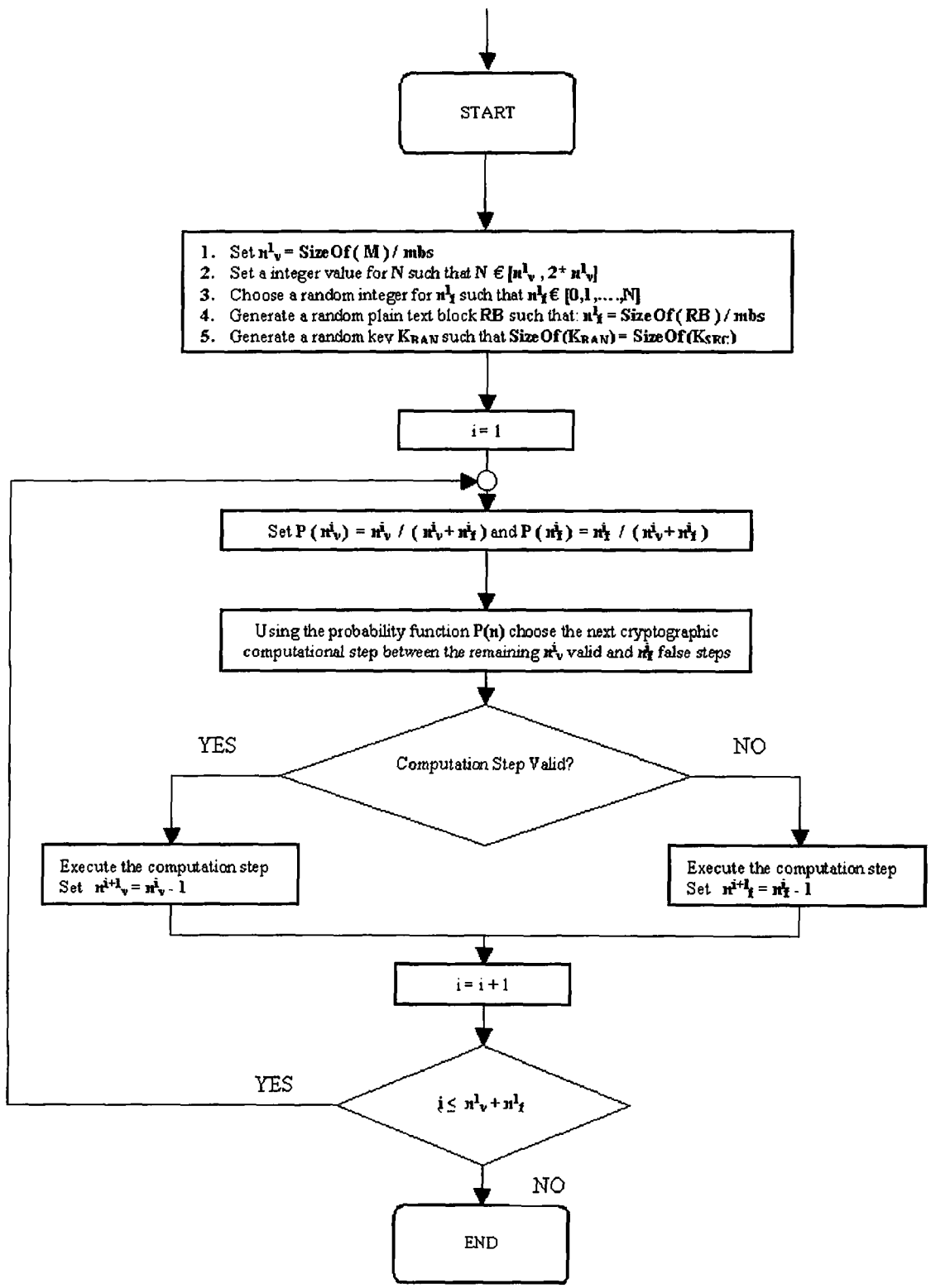
FIG. 3 schematically shows method steps for protecting data, according to the present invention.

With reference to FIG. 3, a pseudo-code representing the method according to the present invention is shown. The whole ciphering algorithm is represented in a sequence of steps. More particularly, a step of initialization provides:

$$n^1_v = \text{SizeOf}(M)/\text{mbs}$$

where $n^1_v$ is a number of remaining cryptographic operations at a first iteration, M is a plain text and mbs is the minimum size in bytes of M. For instance, for DES, Triple DES, AES, mbs may be set to 8-bytes.

The step of initialization also provides to set $n^1_f$ as the number of remaining additional cryptographic operations AOP at the first iteration. For example, $n^1_f$ is a random integer chosen with uniform distribution in the interval $0, 1, 2, \ldots, N$. More particularly, the parameter N is fixed and chosen to balance the performance and the security of the cryptographic algorithm.

For example, N is in the interval $N \in [n^1_v, 2*n^1_v]$. The initialization step also provides generation of a random plain text RB such that:

$$\text{Size Of}(RB) = n^1_f * \text{mbs}$$

A random key $K_{RAN}$ is also generated during the initialization step, so that:

$$\text{Size Of}(K_{RAN}) = \text{Size Of}(K_{SEC})$$

A plurality of iterations follow the initialization step. More particularly, the i-th iteration is such that $$1 \leq i \leq n^1_v + n^1_f, \text{ and}$$

$$P(n^i_v) = n^i_v/(n^i_v + n^i_f) \leq 1$$

where $P(n^i_v)$ is the probability to compute a cryptographic operation at iteration i-th.

Similarly, $$P(n^i_f) = n^i_f/(n^i_v + n^i_f) \leq 1$$

where $P(n^i_f)$ is the probability to compute an additional cryptographic operation AOP at iteration i-th, with $P(n^i_v) + P(n^i_f) = 1$ because of the probability function.

At the i-th iteration the next operation is chosen between the remaining $n^i_v$ cryptographic operation and the $n^i_f$ additional cryptographic operation AOP using the probability functions defined above. More particularly, if the next operation is a cryptographic operation, then it is executed using the corresponding valid parameters, the secret key ESK and the plain text M. After the i-th step, $n^{i+1}_v$ is set so that $$n^{i+1}_v = n_{iv} - 1$$

and the successive step is executed.

On the contrary, if the next operation is an additional cryptographic operation AOP, it is executed using the corresponding random parameters. For example, the random plain text block $RB_i$ and the random secure key $K_{RAN}$ are used. After the i-th step, $n^{i+1}_f$ is set so that $$n^{i+1}_f = n^i_f - 1$$

and the successive step is executed.

Advantageously, the probability function $P(n)$ defined at iteration i-th, is convergent. In fact:

$$P(n^i_v) \leq 1, P(n^i_f) \leq 1, \text{ and}$$

$$P(n^i_v) + P(n^i_f) = 1$$

for each i with $1 \leq i \leq n^1_v + n^1_f$

More particularly, for each i with $1 < i < n^1_v + n^1_f$ $$n^1_v + n^1_f < n^{i-1}_v + n^{i-1}_f$$

If, at iteration (i−1)-th, a cryptographic operation is chosen then:

$$n^i_v + n^i_f = (n^{i-1}_v - 1) + n^{i-1}_f$$

$$P(n^i_v) < P(n^{i-1}_v), \text{ and}$$

$$P(n^i_f) > P(n^{i-1}_f)$$

If, at iteration (i−1)-th, an additional cryptographic operation AOP is chosen then:

$$n^i_v + n^i_f = n^{i-1}_v + (n^{i-1}_f - 1)$$

$$P(n^v_i) > P(n^{i-1}_v), \text{ and}$$

$$P(n^i_f) < P(n^{i-1}_f)$$

At iteration $i = n^1_v + n^i_f$:
Either $n^i_v = 1, n^i_f = 0$ with $P(n^i_v) = 1, P(n^i_f) = 0$; or $n^i_v = 0, n^i_f = 1$ with $P(n^i_v) = 0, P(n^i_f) = 1$ Advantageously, the overall processing time T is a random variable depending on how many additional cryptographic operations AOP are included in the whole ciphering algorithm. The computational time required by the single cryptographic operation T is a random variable with uniform distribution in the interval:

$$T \in [t * n^1_v, t * (n^1_v + n^1_f)]$$

Advantageously, a power analysis attack on IC cards is not only able to dissociate a power consumption by a corresponding cryptographic operation involved in a cryptographic algorithm, but also to mislead such attack through an introducing of additional cryptographic operations AOP. Such additional cryptographic operations AOP sidetrack the attacker, accepting a small loss in terms of performance and providing a countermeasure that makes SPA-DPA and other time attacks more difficult to be implemented.

Advantageously, the order of cryptographic operations and additional cryptographic operations AOP is unpredictable and is balanced according to the required performance of the cryptographic algorithm.

That which is claimed:

1. A method of protecting data against a power analysis attack comprising:
   performing at least one cryptographic operation to cipher the data into corresponding enciphered data through a secret key, using a processor of an IC card; and
   performing at least one additional cryptographic operation on both the enciphered data and additional data thereby corresponding enciphered additional data through an additional secret key different than the secret key, using the processor;
   the at least one cryptographic operation being performed a plurality of times, and the at least one additional cryptographic operation being randomly performed between performances of the at least one cryptographic operation such that the enciphered data is interleaved with the enciphered additional data;
   wherein the additional data and the additional secret key are randomly generated.

2. A method according to claim 1, wherein ciphering the data and ciphering the additional data are performed to be indistinguishable by the power analysis attack.

3. A method according to claim 1, wherein the additional data comprises random plain text.

4. A method according to claim 1, wherein performing the at least one additional cryptographic operation further comprises generating a garbage output to be ignored by the at least one cryptographic operation.

5. A method according to claim 1, wherein the at least one additional cryptographic operation is performed a threshold number of times.

6. A method according to claim 1, further comprising storing the data in a memory of the IC card, using the processor.

7. A method of protecting data in an IC card against a power analysis attack comprising:
   performing a plurality of cryptographic operations in the IC card to cipher the data into corresponding enciphered data through a secret key, using a processor; and
   performing at least one additional cryptographic operation in the IC card randomly between performances of the plurality of cryptographic operations on both the corresponding enciphered data and additional random plain text thereby corresponding enciphered additional data through an additional secret key different than the secret key, using the processor;
   the at least one cryptographic operation being performed a plurality of times, and the at least one additional cryptographic operation being randomly performed between performances of the at least one cryptographic operation such that the enciphered data is interleaved with the enciphered additional data;
   wherein the random plain text and the additional secret key are randomly generated in the IC card.

8. A method according to claim 7 wherein ciphering the data and ciphering the at least one random plain text are performed to be indistinguishable by the power analysis attack.

9. A method according to claim 7, wherein performing the at least one additional cryptographic operation further comprises generating a garbage output to be ignored by the plurality of cryptographic operations.

10. A method according to claim 7, wherein the at least one additional cryptographic operation is performed a threshold number of times.

11. A method according to claim 7, further comprising storing the data in a memory of the IC card, using the processor.

12. An IC card comprising:
an IC card substrate; and
a processor carried by said IC card substrate and being configured to perform at least one cryptographic operation to cipher data into corresponding enciphered data through a secret key, and to perform at least one additional cryptographic operation on both the enciphered data and additional data thereby corresponding enciphered additional data through an additional secret key different than the secret key;
said processor configured to perform the at least one cryptographic operation being a plurality of times, to randomly perform the at least one additional cryptographic operation between performances of the at least one cryptographic operation such that the enciphered data is interleaved with the enciphered additional data;
said processor further configured to randomly generate the additional data and the additional secret key.

13. The IC card of claim 12, wherein said processor performs ciphering the data and ciphering the additional data to be indistinguishable by a power analysis attack.

14. The IC card of claim 12, wherein the additional data comprises random plain text.

15. The IC card of claim 12, wherein said processor performs the at least one additional cryptographic operation by generating a garbage output to be ignored by the at least one cryptographic operation.

16. The IC card of claim 12, wherein said processor performs the at least one additional cryptographic operation a threshold number of times.

17. An IC card comprising:
an IC card substrate; and
a processor carried by said IC card substrate and being configured to perform a plurality of cryptographic operations to cipher data into corresponding enciphered data through a secret key, and to perform at least one additional cryptographic operation randomly between performances of the plurality of cryptographic operations on both the enciphered data and additional random plain text thereby corresponding enciphered additional data through an additional secret key different than the secret key;
said processor configured to perform the at least one cryptographic operation being a plurality of times, and to randomly perform the at least one additional cryptographic operation between performances of the at least one cryptographic operation such that the enciphered data is interleaved with the enciphered additional data;
said processor further configured to randomly generate the random plain text and the additional secret key.

18. The IC card of claim 17, wherein said processor performs ciphering the data and ciphering the additional data to be indistinguishable by a power analysis attack.

19. The IC card of claim 17, wherein the additional data comprises at least one random plain text.

20. The IC card of claim 17, wherein said processor performs the at least one additional cryptographic operation by generating a garbage output to be ignored by the plurality of cryptographic operations.

21. The IC card of claim 17, wherein said processor performs the at least one additional cryptographic operation a threshold number of times.

22. An integrated circuit for an IC card comprising:
a processor configured to
perform at least one cryptographic operation to cipher data into corresponding enciphered data through a secret key,
perform at least one additional cryptographic operation on both the enciphered data and additional data thereby corresponding enciphered additional data through an additional secret key different than the secret key,
perform the at least one cryptographic operation being a plurality of times, and randomly perform the at least one additional cryptographic operation between performances of the at least one cryptographic operation such that the enciphered data is interleaved with the enciphered additional data; and
randomly generate the additional data and the additional secret key.

23. The integrated circuit of claim 22, wherein said processor performs ciphering the data and ciphering the additional data to be indistinguishable by a power analysis attack.

24. The integrated circuit of claim 22, wherein the additional data comprises random plain text.

25. The integrated circuit of claim 22, wherein said processor performs the at least one additional cryptographic operation by generating a garbage output to be ignored by the at least one cryptographic operation.

26. The integrated circuit of claim 22, wherein said processor performs the at least one additional cryptographic operation a threshold number of times.

\* \* \* \* \*

UNITED STATES PATENT AND TRADEMARK OFFICE
CERTIFICATE OF CORRECTION

PATENT NO.      : 8,804,949 B2                       Page 1 of 1
APPLICATION NO. : 11/770997
DATED           : August 12, 2014
INVENTOR(S)     : Fontana et al.

It is certified that error appears in the above-identified patent and that said Letters Patent is hereby corrected as shown below:

In the Claims

Column 7, Line 20     Delete: "being"

Column 8, Line 2      Delete: "being"

Column 8, Line 31     Delete: "being"

Signed and Sealed this
Fourteenth Day of July, 2015

Michelle K. Lee
*Director of the United States Patent and Trademark Office*